United States Patent [19]
Morris

[11] 3,963,093
[45] June 15, 1976

[54] GEOPHONE NOISE REDUCTION METHOD
[75] Inventor: Harold B. Morris, Houston, Tex.
[73] Assignee: Seismic Logs, Inc., Houston, Tex.
[22] Filed: Aug. 23, 1974
[21] Appl. No.: 499,912

[52] U.S. Cl. ................................. 181/122; 181/108; 181/401; 340/17 R
[51] Int. Cl.² .......................................... G01V 1/16
[58] Field of Search ........... 181/400, 401, 402, 122, 181/108, 112; 340/17, 15.5 R, 15.5 CP

[56] References Cited
UNITED STATES PATENTS

| | | | |
|---|---|---|---|
| 2,364,209 | 12/1944 | Green | 340/15.5 R |
| 2,377,903 | 6/1945 | Rieber | 340/15.5 R |
| 3,332,057 | 7/1967 | Pavey, Jr. | 340/7 R |

Primary Examiner—Maynard R. Wilbur
Assistant Examiner—H. A. Birmiel
Attorney, Agent, or Firm—Richards, Harris and Medlock

[57] ABSTRACT

A method of seismic exploration is disclosed wherein an explosive charge is placed in a hole in the ground and wherein a detector is placed in a second hole spaced away from the first hole. The detector is mounted in the bottom of the hole by using an adherent base. The mouth of the hole is sealed to form a quiescent volume in the hole for the detector. Thereafter, the explosive charge is discharged and the output of the detector is recorded.

12 Claims, 5 Drawing Figures

GEOPHONE NOISE REDUCTION METHOD

BACKGROUND OF THE INVENTION

In the seismic exploration systems, it is common to use motion sensitive detectors, such as accelerometers which detect earth vibrations reflected from subsurface formations. During the use of these systems, it is common to form a hole in the ground and place an explosive charge therein. Detectors are positioned away from the explosive charge and are connected to the ground to detect vibrations reflected from subsurface formations upon explosion of the charge.

Although these prior art systems and methods of acquiring seismic data have been acceptable for their purposes, they have not proved entirely satisfactory under all conditions of service because, due to the extreme sensitivity of the detectors, the signal to background noise ratio is low when the system is practiced in wind or in areas where substantial ambient sound noises are present.

SUMMARY OF THE INVENTION

The present invention is directed to a method which has been found to overcome the problems present in making seismic exploration determinations on windy days, and when excessive ambient sounds are present. According to the method of the present invention, a detector is placed in a quiescent volume to eliminate these noises.

More particularly, in accordance with the practice of the method of the present invention, the detector is located in the shallow hole in an adherent base in the bottom of the hole, and the open end of the hole is sealed to provide a quiescent volume around the detector.

BRIEF DESCRIPTION OF THE DRAWINGS

For a complete understanding of the present invention and the advantages thereof, reference may now be had to the following description when taken in conjunction with the accompanying Drawings in which.

DESCRIPTION OF THE PREFERRED EMBODIMENT

Figure 1:
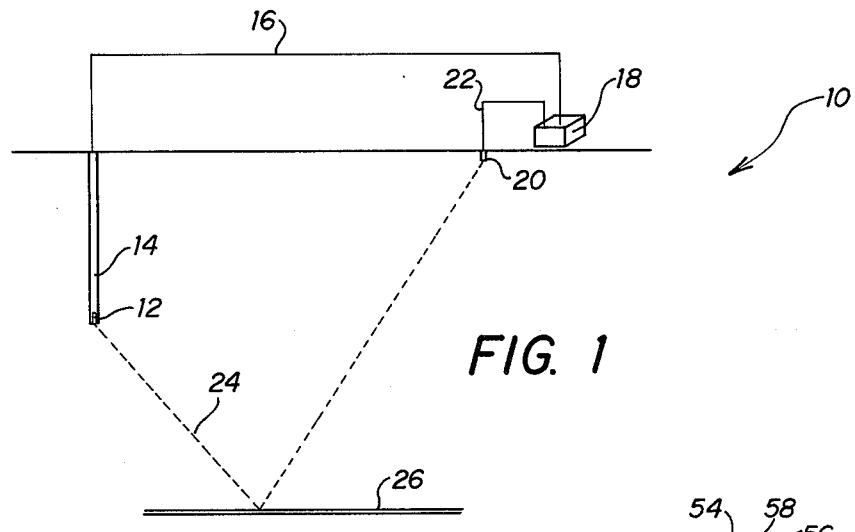
FIG. 1 is a diagrammatic view of a seismic system used in accordance with the teachings of the method of the present invention.

Referring now to the Drawings wherein like reference characters designate like or corresponding parts throughout the several views, as is illustrated in FIG. 1, a seismic exploration system 10 is used to practice the improved method of the present invention. System 10 is of the type utilized to measure the depth and location of various subsurface earth formations. This measurement is accomplished by discharging an explosive device and measuring the reflection of the subsurface wave created by the discharge.

In practicing the method of the present invention, an explosive charge 12 is located in the bottom of a hole 14. Charge 12 is connected by means of a cable 16 to a control apparatus 18 which can be used to discharge charge 12 as required. A detector 20 is located in the bottom of a hole as will be hereinafter described in detail and is connected by means of a cable 22 to apparatus 18. Detector 20 can be any high sensitive motion detector, such as those disclosed in U.S. Pat. Nos. 3,489,997; 3,555,503; and 3,688,251. It is to be understood, of course, that more than one detector is conventionally used and is spaced around charge 12 to provide a plurality of different records of the reflected subsurface wave. For purposes of description, a single detector 20 is illustrated, it being understood, of course, that the method of the present invention would be practiced on all of the detectors in the systems.

In operation, apparatus 18 ignites charge 12 through cable 16 and generates a subsurface wave 24 which travels down and strikes a subsurface formation 26. Wave 24 is reflected back to detector 20 whereupon an electrical output is transmitted through cable 22 to a recorder in apparatus 18. The recordation of the output of detector 20 is evaluated to determine relevant data concerning the subsurface formation.

Figure 2:
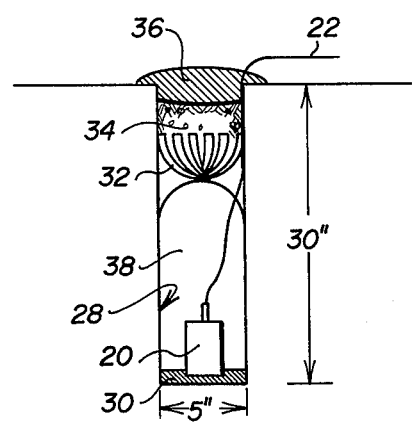
FIG. 2 is a sectional view showing the mounting of a detector according to one embodiment of the method of the present invention.

Referring now to FIG. 2, the details of the practice of the improved method of the present invention will be explained. First, hole 28 is bored in the soil and in the embodiment shown in 5 inches in diameter and 30 inches deep. Detector 20 is positioned in the bottom of hole 28 and is mounted in place by material 30. In the preferred embodiment, material 30 is a high grade casting plaster, sold by U.S. Gypsum under the trademark "Hydro-Stone".

Cable 22 is positioned on one side of the hole 28, and an expandable plug 32 is positioned in the open end of hole 28. Plug 32 can be of any conventional type, which can be expanded to extend across the open end of hole 28, and in the preferred embodiment is a Trojan Spider Plug, manufactured and sold by Exploration Products Company of Palestine, Texas. Thereafter, a quantity of soil 34 is placed in hole 28 on top of plug 32. Hydro-Stone material 36 is placed on top of soil 34 to seal the opened end of hole 28 and form a quiescent volume 38 for detector 20.

Figure 3:
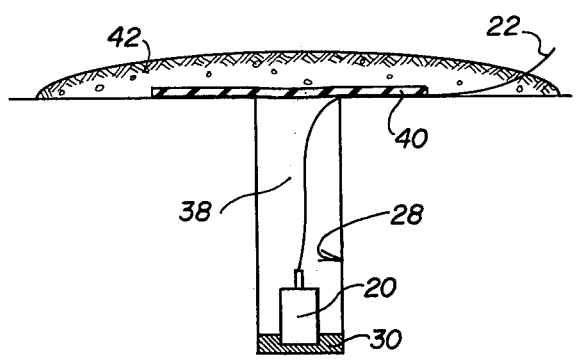
FIG. 3 is a sectional view showing a second mounting configuration of a detector in accordance with a second embodiment of the method of the present invention.

In FIG. 3, a second embodiment of the invention is illustrated. In this embodiment, detector 20 is mounted in the bottom of hole 28 by material 30 in the manner described in FIG. 2. The open end of hole 28 is first covered with a sheet of plastic material 40. Sheet 40 is then covered with a particulate material, such as soil 42 to form a quiescent volume 38 inside of hole 28 for detector 20.

Figure 4:
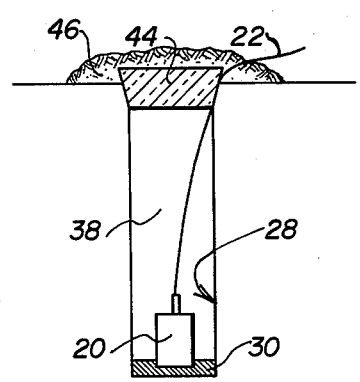
FIG. 4 is a sectional view showing the mounting of a detector in accordance with a third embodiment of the method of the present invention.

A third embodiment is illustrated in FIG. 4 with detector 20 again mounted in material 30 in the bottom of hole 28. A frustoconical wedge 44 is placed over the open end of hole 28 to define a quiescent volume 38. Wedge 44 can be constructed from a suitable material, such as Hydro-Stone casting, and can be placed over the opening with wet earth (mud) 46 providing a seal which lies over hole 28 and wedge 44.

Figure 5:
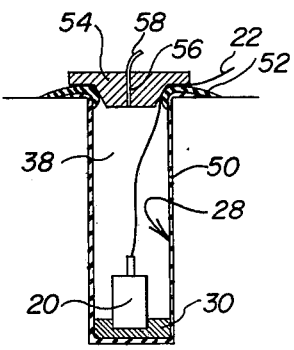
FIG. 5 is a sectional view showing the mounting of a detector in accordance with a fourth embodiment of the method of the present invention.

A fourth embodiment is illustrated in FIG. 5 with the interior of hole 28 coated with hard pitch 50 and detector 20 mounted in material 30 in the bottom thereof. A soft pitch 52 is applied around the open end of hole 28.

A frustoconical wedge 54 is placed over the open end of hole 28 to define a quiescent volume 38. A port 56 is formed in wedge 54 to allow evacuation of chamber 38 to a sub-atmospheric pressure by a suitable means (not shown) connected thereto by conduit 58.

By practicing the method of the present invention and positioning of detector 20, in quiescent volume by sealing, the opened end of hole 28 eliminates any ambient or wind noises which may be present at the time of detonation of charge 12 and increases the signal to noise ratio for detector 20. It is to be understood, of course, that numerous alterations and modifications can be made in the present invention by those of ordinary skill in the art without departing from the spirit and scope of the present invention as defined in the appended claims.

I claim:

1. In seismic exploration, the method of sensing high frequency low noise seismic signals which comprises:
   locating a detector in a shallow hole in an adherent base in the bottom of said hole with said detector spaced from the walls of the hole, and sealing the open end of said hole to provide a quiescent volume of air in said hole surrounding said detector.

2. The method of claim 1 additionally comprising maintaining said quiescent volume at a sub-atmospheric pressure.

3. The method of claim 1 wherein sealing of the open end of said hole comprises covering the open end of said hole with a setting material, and allowing said material to set.

4. The method of claim 1 wherein sealing the open end of said hole comprises:
   placing a plug across said hole;
   placing particulate material in said hole on top of said plug; and
   placing setting material over the open end of said hole over said particulate material.

5. The method of claim 1 wherein sealing the open end of said hole comprises placing flexible sheet material across the open end of said hole and covering said sheet material with particulate material.

6. The method of claim 1 wherein sealing the open end of said hole comprises placing a plug over the open end of said hole.

7. In seismic exploration, the method of sensing high frequency low noise seismic signals which comprises:
   forming a first bore in the earth;
   placing an explosive charge in the bottom of said bore;
   forming a plurality of bores of shallower depth spaced away from said first bore;
   placing detectors in each of said shallow bores in an adherent base in the bottom of said shallow bores with said detectors spaced from the walls of the bores;
   connecting said detectors to a recorder;
   sealing the opening of said shallow bores to provide quiescent volumes of air in each of said bores surrounding said detectors; and
   discharging said explosive charge and recording the output of said detector.

8. The method of claim 7 additionally comprising maintaining said quiescent volumes at sub-atmospheric pressure.

9. The method of claim 7 wherein sealing of the open end of said bores comprises covering the open end of each of said bores with a setting material and allowing said material to set.

10. The method of claim 7 wherein sealing the open end of said bores comprises:
    placing a plug across each of said bores;
    placing particulate material in said bores on top of said plugs; and
    placing setting material over the open end of said bores over said particulate material.

11. The method of claim 7 wherein sealing the open end of said bores comprises placing a flexible sheet material across the open end of each of said bores and covering said sheet material with particulate material.

12. The method of claim 7 wherein sealing the open ends of said bores comprises placing a plug over the open end of each of said bores.

* * * * *